United States Patent [19]
Bailey

[11] 3,767,932
[45] Oct. 23, 1973

[54] REMOTE VEHICLE STARTING SYSTEM
[76] Inventor: Charles A. Bailey, 1926 Genessee Ave., Columbus, Ohio
[22] Filed: Sept. 1, 1972
[21] Appl. No.: 285,632

[52] U.S. Cl. .................................. 290/38, 290/37
[51] Int. Cl. ............................................. F02n 11/00
[58] Field of Search .................. 290/37, 38, DIG. 3; 123/179 B

[56] References Cited
UNITED STATES PATENTS

| | | | |
|---|---|---|---|
| 3,633,040 | 1/1972 | Baxter | 290/DIG. 3 |
| 3,078,834 | 2/1963 | Wright | 290/37 |
| 3,675,032 | 7/1972 | Shaheen | 290/38 |
| 3,553,472 | 1/1971 | Arlandson | 290/DIG. 3 |
| 3,053,989 | 9/1962 | Porter et al. | 240/DIG. 3 |
| 3,455,403 | 7/1969 | Hawthorne | 290/DIG. 3 |
| 2,739,247 | 3/1956 | Pope | 290/DIG. 3 |
| 3,163,770 | 12/1964 | Smedley | 290/38 |

Primary Examiner—G. R. Simmons
Attorney—William V. Miller et al.

[57] ABSTRACT

A remote starting system for automotive type vehicle engines is provided having a control unit interconnected by an electrical cable with a relay actuated vehicle operating circuit and apparatus in a vehicle. The operating circuit includes a starting circuit, an engine run circuit and a holding relay circuit for maintaining the vehicle engine in operation when the engine is once started. The control unit includes a manual switch for selective energization of an electrical solenoid in the vehicle operating circuit, for actuating the carburetor throttle prior to initiating starting of the engine. Once started, the vehicle engine continues to run through the engine run circuit and the holding relay circuit irrespective of disconnection of the control unit from the vehicle operating circuit as by disconnection of the control unit from the vehicle operating circuit as by disconnecting the electrical cable from the vehicle. An engine operation monitoring system is also provided at the remotely located control unit.

4 Claims, 2 Drawing Figures

PATENTED OCT 23 1973 3,767,932

REMOTE VEHICLE STARTING SYSTEM

BACKGROUND OF THE INVENTION

Automotive vehicle owners or operators have found it particularly advantageous to remotely start the vehicle engine when parked closely adjacent their residence. The primary reason for remote starting is that the operator may remain in his residence on either cold winter or hot summer days and start the vehicle engine at a predetermined time before expected departure thereby enabling the engine to reach a more desirable operating temperature, particularly important in winter, and to permit operation of the vehicles heating or cooling system prior to the operator entering the vehicle. Allowing sufficient time for operation will thus enable the heating system to remove or greatly facilitate removal of ice, snow or frost in the winter and enable the cooling system to properly cool the vehicles interior in the summer.

BRIEF DESCRIPTION OF THE INVENTION

To accomplish the objective of remote starting of the vehicle, an electrical control unit is provided and located in the vehicle operator's residence remote to the vehicle and interconnected by a cable with a vehicle operating circuit installed in the vehicle. Included in the vehicle operating circuit is an electric solenoid mechanically linked with the carburetor throttle permitting remote setting of the carburetor prior to initiating an engine starting operation. A manually operated enabling switch is connected in the vehicle operating circuit which is preset by the operator when a remote start is to be effected at a subsequent time. A relay controlled start circuit in the operating circuit permits remote energization of the electrical starter with an engine run circuit continuing engine operation after start through a holding relay circuit. Remote stopping of engine operation is provided by a relay actuated switch in the holding circuit.

The control unit includes manually operated electrical switches for selective energization of respective relays or solenoid in the vehicle operating circuit from an electrical power source independent of the vehicles power source. An electrical cable interconnects the control unit with the vehicle operating circuit and is provided with a cable connector at the vehicle to readily permit connecting or disconnecting of the vehicle.

Operation of the remote starting system of this invention involves a simple sequence of events after first connecting the control unit to a suitable power source. First, the operator energizes the throttle actuating solenoid and, second, energizes the start relay. Assuming that the engine is operating and a predetermined time adequate for warm-up has elapsed, the operator switches off the power source, separates the cable connector which does not stop engine operation, enters the vehicle and inserts the key in the ignition which is then placed in the normal run position. The enabling switch is then turned off thereby preventing the remote system circuit from interfering with normal vehicle operation. During the period of time that the remote starting system is operating, or has been placed in condition for operation, the ignition key would be removed from the vehicles ignition switch leaving the steering column and shift lever locked. This makes the vehicle as theft-proof as a vehicle would normally be regardless of whether the engine has been started, or could be started by this remote starting system.

DESCRIPTION OF THE ILLUSTRATED EMBODIMENT

Figure 1:
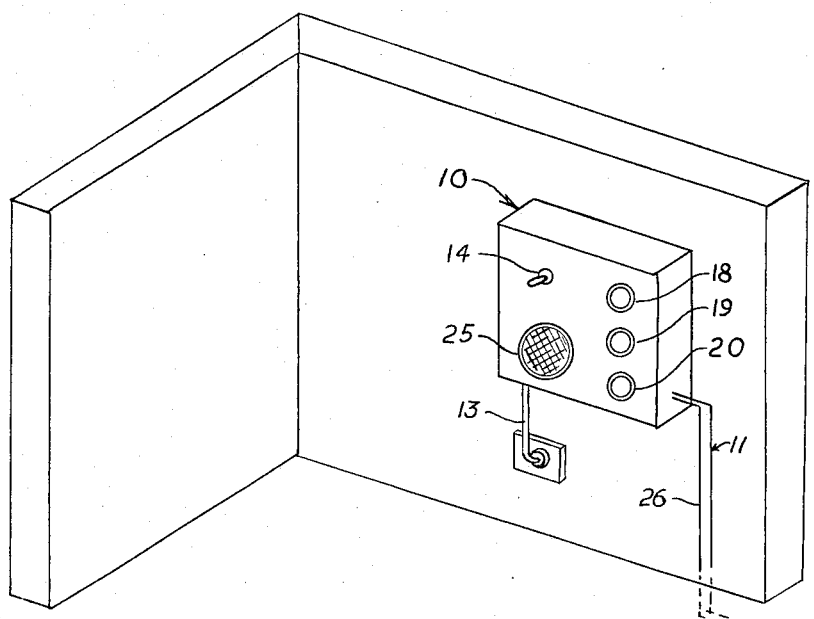
FIG. 1 is a diagramatic illustration of an embodiment of this invention with the control unit connected with a vehicle provided with an operating circuit.
Figure 1:
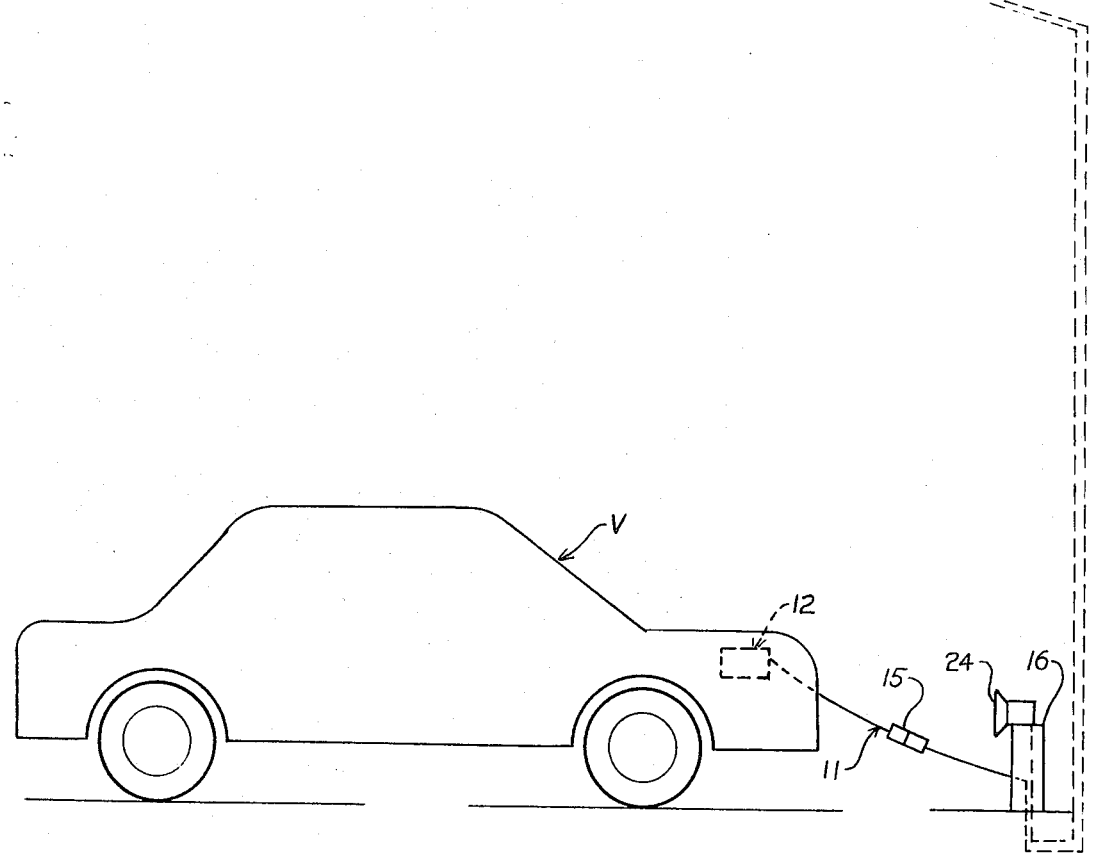

Referring to FIG. 1, an embodiment of this invention is shown having a control unit 10 installed in a residence and connected by a cable 11 with an operating circuit 12 installed in a vehicle V. The control unit is shown, by way of example, as being mounted on an interior wall of a residence and provided with a power cable 13 connected in circuit with the electrical wiring system of the residence. This power cable 13 preferably includes three conductors, one of which is grounded. An "ON-OFF" electrical switch 14 is operated to energize the control unit when it is desired to effect remote starting of the vehicle.

The cable 11 extends from the control unit 10 to the area adjacent the residence where the vehicle V is customarily parked and is interconnected with the vehicle operating circuit 12. The cable 11 extends from the residence to a point immediately adjacent that where the vehicle is normally positioned when the vehicle is parked in the designated space. As determined by the particular circumstances of a specific installation, the cable 11 may be either buried in the ground or supported overhead on suitable posts or supports. The cable is provided with a connector 15 which facilitates connection and disconnection of the vehicle operating circuit 12 in the system. This connector 15 is best interposed in the cable 11 at the point where it enters the vehicle to avoid having any substantial length of loose cable projecting from the vehicle. Both portions of the connector 15 may be provided with weather seals to better avoid having the several contacts fouled by dirt or moisture and the free end of the cable emerging from the ground may be secured to a protective post 16.

Figure 2:
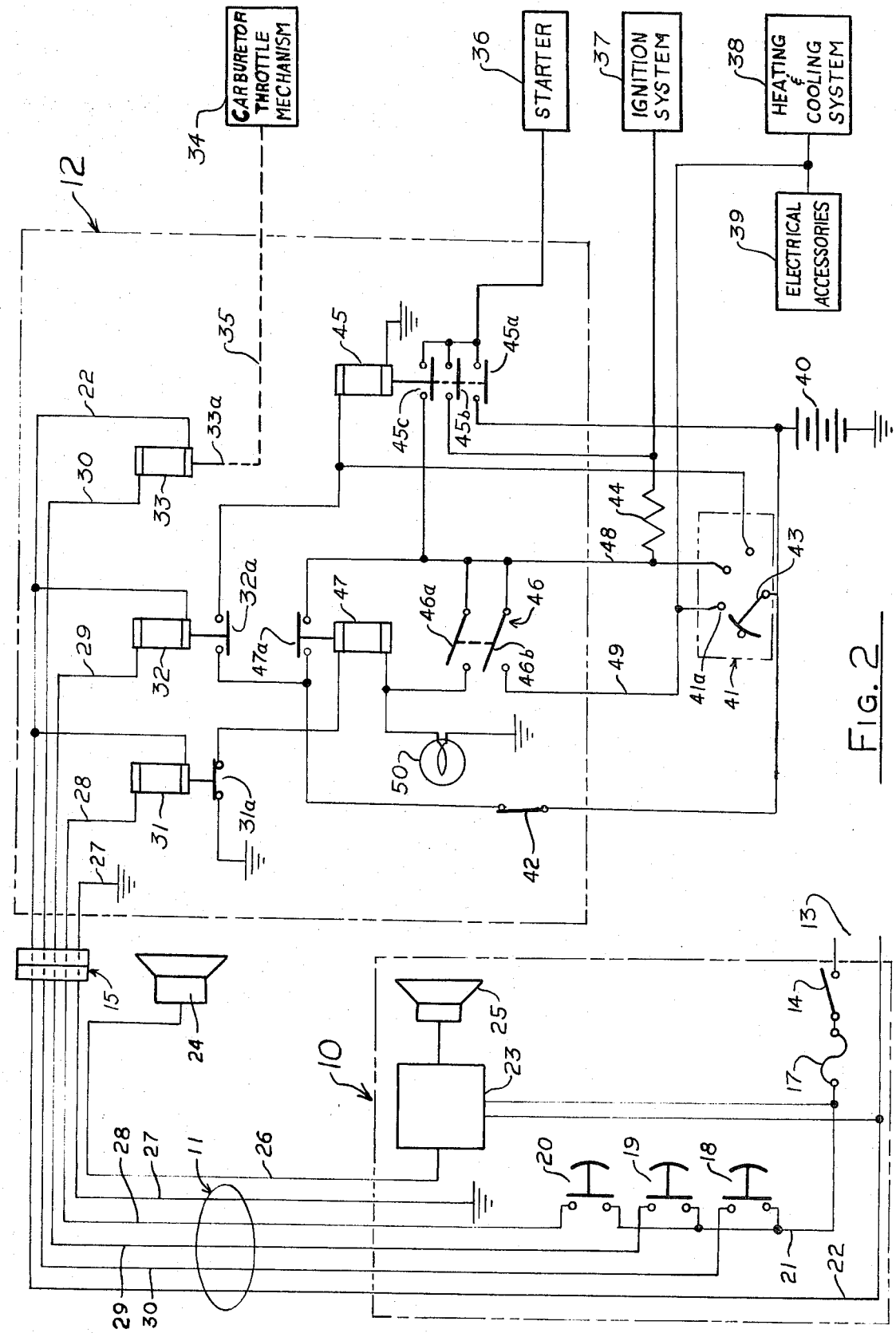
FIG. 2 is a schematic diagram of the electrical circuit of the invention embodiment.

The control unit 10, referring to FIG. 2, in addition to the switch 14, a fuse 17 interposed in the power cable and three control switches 18, 19 and 20. Each of the control switches is of a momentary contact type, such as a push button switch, having a set of normally open contacts with one terminal of each connected to a common conductor 21 leading from the fuse 17 and the power source. A second conductor 22 in the control unit leads from the power source and, with the conductor 21 forms the power cable pair.

Also incorporated in this system, is an intercommunications apparatus to permit the operator to aurally monitor starting and operation of the vehicles engine. This intercommunications apparatus includes a suitable electronics circuit 23 preferably mounted in the control unit 10, a microphone 24 and a speaker 25. The electronics circuit 23 is connected to the electrical power conductors 21, 22 so that it is only energized whenever switch 14 is closed. Mounting of the speaker 25 in the control unit provides a compact unit. The acoustical sensing device or pick-up unit 24 may be advantageously mounted on the post 16 adjacent the vehicle parking area so as to be readily responsive to the sounds of the vehicle. A suitable cable 26 interconnects the pick-up unit with the electronics circuit, with this cable 11.

The cable 11, in addition to the conductor 22, includes the conductors 27, 28, 29 and 30 which extend from the control unit 10 to the vehicle operating circuit 12 through the connector 15. Conductor 27 is grounded to the vehicle V at one end while the other end is grounded to the control unit enclosure and the power source in accordance with electrical safety codes. Each of three conductors 28, 29 and 30 are connected to a second terminal of a respective control switch 18, 19 and 20 in the control unit 10 and to the coils of respective relay switches 31 and 32 and solenoid 33 that are located in the vehicle. A second terminal of each relay or solenoid coil is connected to the conductor 22 to complete the electrical circuit to each.

It will be noted that this circuit arrangement for supply of electrical power to the relay switches 31, 32 and solenoid 33 in the vehicle operating circuit 12 results in relative independence from the control unit 10. The advantage is that the cable 11 is not energized except for the brief instances that the relays or solenoid are energized other than the intercommunication cable 26 which is very low voltage.

Mechanically coupled with the armature 33a of the solenoid 33 is the carburetor throttle mechanism 34. A mechanical linkage 35 provides the coupling and is operative upon energization of the solenoid 33 to set the carburetor choke and actuate the fuel boost pump. Selective energization of the solenoid 33 is accomplished by closing of switch 18 when the control unit is energized. For a usual starting procedure, it is only necessary to momentarily close switch 18 for a period of time sufficient to effect energization of solenoid 33 and accomplish a single cycle of operation of the carburetor throttle mechanism.

Electrically interconnected with the vehicle operating circuit 12 are the vehicle's starter 36, ignition system 37, heating and cooling system 38 and other electrical accessories 39. These components derive electrical power for their operation from the vehicle's battery 40, or from the vehicle's electrical generating system when the engine is operating. Since the vehicle's generating system is not significant with respect to describing an embodiment of this invention, such a system is not shown but will be understood to be fully equivalent to the battery 40 shown in FIG. 2. Also interconnected in circuit with the vehicle operating circuit 12 as well as the ignition system 37 heating and cooling system 38 and electrical accessories 39 is the vehicle's key-operated ignition switch 41. Another electrical switch which is interconnected with the vehicle operating circuit 12 is a transmission safety switch 42. Conventionally, this switch is provided with contacts that are closed only when the transmission is in "PARK" and are open whenever the transmission is placed in a driving condition. Accordingly, the switch 42 is shown closed on the assumption that the transmission is positioned to permit starting.

The ignition switch 41 also is only shown to the extent necessary to illustrate interconnection with the vehicle operating circuit 12 and other illustrated vehicle components. As shown, the ignition switch 41 comprises three positions with the movable contact 43 placed in the "OFF" position. In either the "RUN" or "START" positions, the movable contact 43 would complete a circuit from the battery 40 to the ignition system 37 through a coil resistance 44. The accessories 39 and heating and cooling system 38 are connected to an accessory terminal 41a and would be energized in the "RUN" positions while the starter would only be energized when the switch is placed in the "START" position. For utilization of this remote starting system, the ignition switch 41 would be left in the illustrated "OFF" position.

Including in the vehicle operating circuit 12 is a starting circuit which comprises a starter relay switch 45 and the normally open contacts 32a of the starting relay 32. An electrical circuit is completed through the operating coil of relay 45 when the starting relay contacts 32a are closed and the transmission switch 42 is closed. Operation of the control switch 19 in the control unit 10 to close its contacts will result in energization of relay 32 and closing of its contacts 32a. The relay switch 45 is provided with three normally open contacts 45a, 45b and 45c with contacts 45a interposed in a circuit between the battery 40 and starter 36. Consequently, energization of relay switch 45 closes its contacts 45a resulting in energization of the starter. Concurrently with energization of the starter 36, a circuit is completed through the contracts 45b to the ignition system for its energization with electrical power being obtained from the battery 40 through contacts 45a and 45b which are simultaneously closed.

While merely holding control switch 19 closed will energize the starter 36 and ignition system 37 to start the vehicle engine, engine operation would cease upon release or opening of switch 19. An engine run circuit is provided to maintain engine operation once the control switch 19 is released and returns to its open circuit configuration which results in deenergization of relay switch 32 and opening of its contacts 32a. This engine run circuit includes a manually operated, double pole, single throw enable switch 46 and a relay switch 47 having a holding circuit. Prior to a time at which it is desired to initiate a remote start operation, the enable switch 46 would be placed in a closed configuration with the ignition switch 41 in the illustrated "OFF" position. Closing of control switch 19 now, through energization of relay switch 32 and 45, will complete a circuit from the battery 40 through closed contacts 45a and 45c to closed enable switch contacts 46a and thence through the coil of relay switch 47 and the normally closed contacts 31a of relay switch 31 to ground. Energization of relay switch 47 closes its contacts 47a to complete a circuit from the battery 40 through the transmission safety switch 42 to the enable switch contacts 46a. This forms a holding circuit to maintain energization of the relay switch 47 even though relay switch 45 should now be deenergized as a consequence of opening control switch 19 on the assumption that the vehicles engine has been started. A conductor 48 provides for energization of this ignition system at this time.

At any time it is desired to stop engine operation, momentarily actuating control switch 20 will complete a circuit for energization of relay switch 31. Energization of relay switch 31 opens its associated contacts 31a which disrupts of the holding circuit for relay switch 47 resulting in its deenergization and opening of contacts 47a. While the ignition system 37 was initially energized through contacts 45b of the starter relay switch 45, a second circuit for its energization was provided by interconnection with the enable switch 46 and switch contacts 47a by a conductor 48. Consequently, opening of relay contacts 47a also results in deenergization of the ignition system 37.

At the same time that the engine is being started and after starting, a circuit is completed for energization of the electrical accessories 39 and the heating and cooling system 38 through a second contact 46b of the enable switch 46 and a conductor 49 that connects with the terminal 41a of the ignition switch 41 designated as the accessory terminal and through which the accessories normally derive their electrical power. This permits the accessories 39 and the heating and cooling system 38 to continue operating after the vehicle engine has been started, assuming that the respective controls of those desired to be operated have been left in a position where they will operate once the necessary circuits have been completed to effect energization. It will be apparent that continued operation of the accessories and heating or cooling system is dependent on the relay switch 47 and opening of the holding circuit contacts 47a will also result in deenergization of the accessories and the heating and cooling system.

Indication of operation of the run circuit is provided by an electrical lamp 50. The electrical lamp 50 as well as the enable switch 46 are conveniently mounted on the instrument panel of the vehicle within eazy reach or observation of the vehicle operator.

Once the vehicle engine has been started through operation of the control switch 19, the control unit 10 may be deenergized through opening of switch 14. With the control unit 10 deenergized, the vehicle engine will continue to operate through the engine run circuit and holding circuit in the vehicle operating circuit 12 since the necessary electrical power is derived from the vehicle's battery 40. However, if continued monitoring of engine operation is desired, then the control unit 10 must continue to be energized to maintain the intercommunication apparatus in operation.

When the operator desires to drive the vehicle, as after allowing a sufficient time for engine warm-up and stabilization of the vehicle's interior temperature through operation of the heating and cooling system 38, the control unit 10 is deenergized through opening of switch 14. As previously noted, the vehicle engine continues to operate and as the operator approaches the vehicle, the operator will disassemble the connector 15 prior to unlocking the vehicle's doors and entering the vehicle. Upon entering the vehicle the operator then inserts the key into the ignition switch 41 and merely places the ignition switch in the "RUN" position since the engine remains running and will continue to run. This permits the operator to deenergize and disconnect the control unit from the vehicle prior to entering the vehicle and which is a preferred operational sequence that does not necessitate restarting of the vehicle engine. At this point, the enable switch 46 is preferably opened to prevent any subsequent interference in the normal operation of the vehicle.

It will thus be readily apparent that a novel remote vehicle starting system is provided which has a relatively simple circuit that may be easily interconnected with the existing vehicle circuits and apparatus. This novel circuit utilizes the a.c. electrical power available in the residence to remotely control engine operation and comprises a circuit arrangement that does not require the cable interconnecting the vehicle with the relatively remote control unit to be continuously energized during remote vehicle operation. An important objective is thus achieved in that this cable may be disconnected prior to entering the vehicle and utilizing the ignition key to place the vehicle in a normal operating configuration.

Having thus described the invention, what is claimed is:

1. A remote vehicle starting system for a vehicle having an engine, starter carburetor throttle mechanism and ignition system for the engine, battery and a heating and cooling system, comprising in combination,
   a control unit positionable relatively remote to the vehicle having a source of electrical power and a plurality of selectively-operable electrical switches having normally open contacts,
   a multiple conductor, electrical cable connected with said control unit switches and extending from said control unit to the vehicle and provided with a separable connector,
   a vehicle operating circuit installed in the vehicle and connected with said cable and including,
      an electrical solenoid having an armature mechanically coupled with the carburetor throttle mechanism and electrically connected through said cable to one of said control unit switches for selective energization thereof and actuation of the throttle mechanism,
      a starting circuit having relay switch means including normally open switch contacts connected in electric circuit with the battery and starter and an operating coil electrically connected through said cable with another of said control unit switches for selective energization thereof and closing of said switch contacts to energize the starter,
   an engine run circuit including
      a manually operated enabling switch and circuit means connected with the ignition system connectable in circuit with the battery through a first circuit including normally open contacts of said starting circuit relay switch means and through a second circuit including normally open contacts of a holding relay switch, said holding relay switch having an operating coil connectable in circuit with the battery through said enabling switch whereby, when said enabling switch is in a current conducting configuration, said holding relay switch operating coil will be energized when the starter is energized and will then remain energized.

2. A remote vehicle starting system according to claim 1 wherein said vehicle operating circuit includes stop relay switch means having an operating coil electrically connected through said cable with a third one of said control unit switches for selective energization thereof and normally closed switch contacts connected in circuit with the operating coil of said holding relay switch whereby actuation of said stop relay switch means will deenergize the holding relay coil and stop operation of the engine.

3. A remote vehicle starting system according to claim 1 wherein the enabling switch of said engine run circuit includes an auxiliary circuit connecting with the heating and cooling system for activation thereof in accordance with pre-set controls.

4. A remote vehicle starting system according to claim 3 wherein said enabling switch includes a first switch contact connected in circuit with the operating coil of said holding relay switch and a second switch contact connected in circuit with said auxiliary circuit, said first and second switch contacts each having a terminal connectable in circuit with the battery through either the first or second circuit of said engine run circuit.

* * * * *